Figure 1:
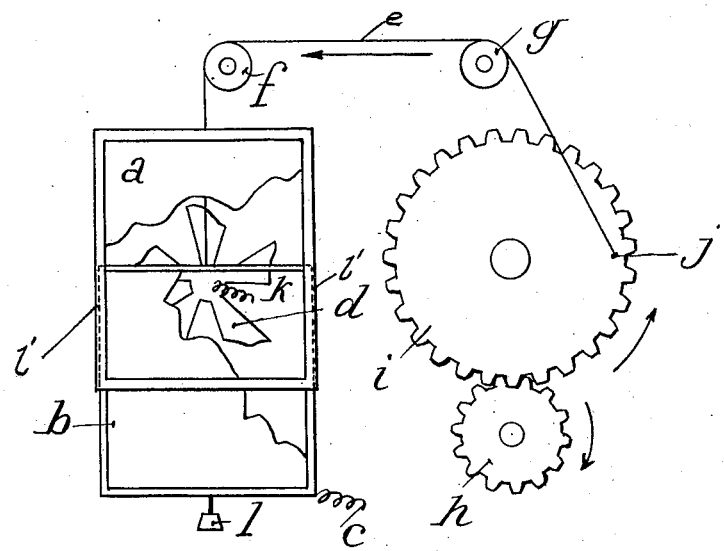

C. P. FLACHAIRE.
CHANGEABLE SIGN.
APPLICATION FILED OCT. 18, 1910.

1,033,239.

Patented July 23, 1912.

Witnesses:-
J. E. Hehler.
Geo. C. Heinicke.

Inventor:-
Charles Paul Flachaire
by B. Singer
Atty

UNITED STATES PATENT OFFICE.

CHARLES PAUL FLACHAIRE, OF PARIS, FRANCE.

CHANGEABLE SIGN.

1,033,239.  Specification of Letters Patent.  Patented July 23, 1912.

Application filed October 18, 1910. Serial No. 587,649.

*To all whom it may concern:*

Be it known that I, CHARLES PAUL FLACHAIRE, a citizen of the French Republic, residing at Paris, France, 13 Rue de Picpus, have invented certain new and useful Improvements in Changeable Signs, of which the following is a specification.

The present invention relates to means for utilizing the property possessed by the double iodid of mercury and silver whereby it turns from a yellow color to a red color under the action of heat and back to a yellow color when it is cooled. According to the present invention this peculiar property of the double iodid of mercury and silver is made use of for advertising purposes and I accordingly have embodied the invention in a device for this purpose, which is capable of employing not only the said double iodid of mercury and silver, but also other chemicals which are capable of changing their colors when the temperatures are raised or lowered.

The iodid of mercury and silver is yellow at the ordinary temperature and turns to a red color under the influence of heat when a temperature of about 45° C. is reached; the substance returns to its original yellow color when allowed to cool, however. The material ought not to be too highly heated, because then a chemical decomposition results.

The double iodid of mercury and silver may be prepared according to the general method employed for the preparation of double iodids; or it may be prepared by treating a mercurial salt in excess with iodid of potassium and nitrate of silver, whereby a yellow orange precipitate is obtained. This is collected and washed with water containing a small quantity of mercurial salt.

As before pointed out, according to the present invention the turning properties of this substance may be applied to advertising, but it may also be applied to pictures, cards and the like, where novel effects are desired, such as would result in the article to which the compound has been applied being subjected to the action of heat or cold.

The particular embodiment of the present invention consists in applying the double iodid of mercury and silver to a screen, sheet of glass, fabric, sheet of paper, or the like, so that the material will either form letters or pictures for advertising matter, or the material may be employed on such screen or the like in any desired manner in connection with advertising matter formed according to any of the known methods. When the iodid of mercury and silver is to be fixed on paper, glass, or any fabric, it may be caused to adhere to the substances by mixing it with a suitable gum, honey, linseed oil, white of egg, solution of sugar, &c., to which, if desired, suitable varnishes or drying agents may be added. The iodid may be mixed with inactive materials or other colors. By juxtaposition of the iodid with yellow or other fixed coloring materials which are not sensitive to the action of heat, the iodid of mercury and silver will change color under the influence of heat in a manner whereby a display of greatly varied colors will be obtained. When the iodid is mixed with materials having a fixed blue color, on heating the general effect will be violet-red.

When, according to the present invention, the iodid of mercury and silver is utilized to form letters or pictures for advertising purposes, the material can, for instance, be painted on a screen of any suitable material which screen is of a yellow color which does not change upon heating. Then when the iodid is heated, it will turn red, and on being cooled again, will return to its yellow color, the same as that of the screen, so that in effect the sign will be caused to disappear and reappear at intervals.

In effecting the present invention, a screen consisting of one of the materials above named, for instance paper, textile fabric, or glass, is constructed and placed in a position where it is desired to display advertising matter. The heat sensitive iodid of mercury and silver is affixed to the screen in such a manner as to form letters or pictures of advertising matter, or it may be so applied to form any desired design. Back of the screen to which the iodid has been applied, a heating device of any suitable form may be disposed for the purpose of intermittently heating the screen at the points where the iodid appears, or for heating the entire screen. An electric resistance heater is most convenient for practical use.

The use of a cooling device is not absolutely necessary, as the cooling may result from the ordinary cooling of the material to the temperature of the atmosphere, and if the atmosphere is sufficiently cool, the cooling can be rapidly effected. When however it is desired to cause the changes in the color of the material to take place in quick succession, it is preferable to employ some special cooling device, so that the cooling can be more rapidly effected. In practice, it is desirable that the material forming the screen to which the iodid has been applied for advertising purposes be as thin as possible, because then the changing of the color of the material will be more rapidly effected.

The cooling is preferably effected by means of one or more fans which remain at rest while the material is being heated, and can be started into operation at the instant at which it is desired to cool the material.

In the accompanying drawings, I have shown two structural embodiments of the invention as applied to advertising purposes.

Figure 2:
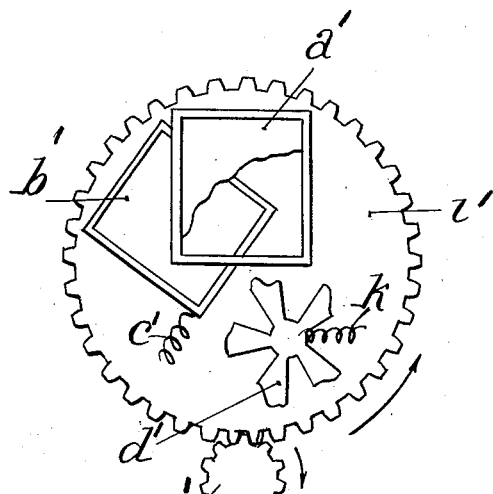

In the accompanying drawings Figure 1 represents a diagrammatical view of one arrangement of apparatus, and Fig. 2 represents a diagrammatical view of another form of construction.

Referring particularly to Fig. 1, $a$ designates the screen consisting of one of the materials above mentioned or any suitable material, to which the iodid of mercury and silver is applied in the manner above described. The letter $b$ represents a heating means, which in the present example consists of an electric resistance, arranged at a small distance behind the screen $a$, current entering the said electric resistance at $c$. Arranged at a suitable distance behind screen $a$ is a fan $d$ for cooling the screen to a temperature at which the double iodid will reassume its yellow color. The fan $d$ should be behind resistance $b$, the fan in this embodiment of the invention being stationary. A belt $e$ having one end attached to the electric resistance $b$ passes over pulleys $f$ and $g$ and has its other end attached to a gear wheel $i$ at the point $j$. Wheel $i$ meshes with a wheel $h$ to which motive power is applied, the wheel $i$ having a diameter about equal to the height of the screen $a$. The wheels $i$ and $h$, and pulleys $f$ and $g$ may have any suitable position with reference to the screen $a$, but preferably are placed behind the latter. From the arrangement described it will be easily understood that when the driving wheel $h$ is rotated in the direction of the arrow, the wheel $i$ will rotate in the opposite direction, and the electric resistance $b$, attached to the end of belt $e$, will be caused to descend so that it will be incapable of heating the screen $a$. The portions of the screen to which the double iodid has been applied which had appeared of a red color when the electric resistance $b$ was in its upper position, will then cool so as to display a yellow color, more or less rapidly. After the advertising matter has appeared in yellow colors for the length of time desired, the electric resistance $b$ is again raised so as to heat the screen $a$ and cause the iodid to appear red, which of course may be done by rotating the driving wheel $h$ in a direction opposite to that of the arrow. The fan $d$ will be operated during the time that the electric heater is in a position below the screen so as to hasten the cooling of the screen and the resulting turning of the iodid to a yellow color. A weight $l$ is used for holding the heating means in a vertical position, the heating means being capable of moving on two parallel guides $l'$, $l'$.

In the example of construction in Fig. 2, both the heating means and cooling means are movable with respect to the screen. In this figure $a'$ denotes the screen to which the double iodid is applied, $b'$ is the electric heater with its current supply wire $c'$, and $d'$ is the fan for cooling the screen. In the construction shown the parts $b'$ and $d'$ are mounted upon a wheel $i'$ in such a manner that they move with said wheel, the arrangement being such that when the electric heater $b'$ is behind the screen $a'$ the fan $d'$ is below the screen. Then by rotating the wheel $i'$, after one-half a revolution, when it is desired to cool the screen $a'$, the fan will assume a position behind screen $a'$, and the electric heater $b'$ will be in a position beneath the screen $a'$. Thus the heating and cooling of the screen may be intermittently effected so as to cause the advertising matter to appear yellow and red successively. As in Fig. 1 hereinbefore described, a driving wheel $h'$ imparts rotation to the wheel $i'$ by meshing with the same.

It will be understood that the arrangement above described in connection with Figs. 1 and 2 is merely an example of the manner in which the invention may be carried into practice, as other suitable mechanical devices which give the same effect, that is, which may cause the chemical substance to intermittently change its color, for advertising purposes, may be employed.

In connection with the apparatus above described, instead of the double iodid of mercury and silver, I may employ other chemicals which change their color under the influence of heat or cold.

I claim:

1. An advertising device comprising a display surface consisting of suitable material and having a chemical capable of changing its color when heated applied thereto to form advertising matter, and means for intermittently heating and cooling the display surface with its applied chemical, whereby the advertising matter appears successively red and yellow, respectively.

2. An advertising device comprising a display surface consisting of suitable material and having a chemical capable of changing its color when heated applied thereto to form advertising matter, means arranged adjacent said display surface for heating the same, and means for intermittently moving said heating means toward and away from said display surface.

3. An advertising device comprising a display surface consisting of a suitable material and having a chemical capable of changing its color when heated applied thereto to form advertising matter, means arranged adjacent said display surface for heating the same, means for intermittently moving said heating means toward and away from said display surface, and a cooling device for assisting the cooling of said display surface when said heating means is removed.

4. An advertising device comprising a display surface consisting of suitable material and having double iodid of mercury and silver applied thereto to form advertising matter, means arranged adjacent said display surface for heating the same, means for intermittently moving said heating means toward and away from said display surface, and a cooling device movable toward and away from said display surface so as to be adjacent said surface when said heating means is removed.

In testimony whereof I affix my signature in presence of two witnesses.

CHARLES PAUL FLACHAIRE.

Witnesses:
  VICTOR PRÉVOST,
  H. C. COXE.

---

Copies of this patent may be obtained for five cents each, by addressing the "Commissioner of Patents, Washington, D. C."